Patented Aug. 31, 1937

2,091,483

UNITED STATES PATENT OFFICE 2,091,483

MANUFACTURE OF SECONDARY AND TERTIARY ALKYL PHENOLS

John F. Olin, Philadelphia, Pa., assignor to The Sharples Solvents Corporation, Philadelphia, Pa., a corporation of Delaware No Drawing. Application November 2, 1934, Serial No. 751,187

4 Claims. (Cl. 260—154)

The present invention relates to the alkylation of phenolic compounds by the substitution for hydrogen attached to one or more nuclear carbon atoms of such compounds of a secondary or tertiary alkyl radical. Examples of phenolic compounds which may be subjected to alkylation in accordance with the invention are simple phenol, di-hydroxy phenols such as resorcinols, alkyl substituted phenols such as cresol, and polynuclear phenols such as naphthol. The process of the invention is applicable to all such compounds containing hydroxyl radicals attached to the benzene nucleus and containing one or more benzene rings, whether or not such compounds contain other substituents, provided the compound to be alkylated contains at least one nuclear carbon atom to which replaceable hydrogen is attached.

The production of the desired alkyl derivative is accomplished, in the practice of the invention, by the reaction of the alkyl chloride having the desired secondary or tertiary alkyl radical with the phenolic compound to be alkylated. The performance of alkylation reactions by means of alkyl chlorides and by the aid of suitable catalysts, such as anhydrous aluminum chloride or equivalent catalyst, is of course well known in the art as the Friedel & Crafts reaction. Friedel & Crafts reactions, of the general type, involve the use of large amounts of catalyst and the laborious operation of removing used catalyst from the reaction mixture by a washing operation, which must be performed after the completion of the reaction.

The present invention rests upon the discovery that it is possible to produce the secondary and tertiary alkyl derivatives of phenolic compounds by direct alkylation thereof by reaction of such phenolic compounds with secondary or tertiary alkyl halides without the use of catalysts or by the use of very small proportions of catalysts, thereby avoiding much of the expense and labor involved in the conventional Friedel & Crafts procedure. The invention was conceived in connection with research pertaining to the production of secondary and tertiary alkyl derivatives of phenol in which the alkyl radical contains from four to six carbon atoms but it may also be used in the production of the higher alkyl derivatives of phenol and of other phenolic compounds, as discussed above.

In the practice of the invention, a secondary or tertiary alkyl halide is first mixed with the phenolic compound to be alkylated in approximately stoichiometric proportions and the mixture is subjected to a gentle heating operation under efficient reflux to effect reaction between the phenolic compound and the alkyl halide. Hydrogen halide is evolved during the heating operation and is allowed to escape from the zone of reaction. The heating operation is continued as long as hydrogen halide continues to be evolved from the mixture. At the conclusion of the evolution of hydrogen halide the mixture is vigorously refluxed to effect conversion of the intermediate compound resulting from the reaction between the initial ingredients into the desired secondary or tertiary alkyl derivative of the phenolic compound which is subjected to the alkylation reaction. The resulting mixture is thereafter purified by distillation.

In the practice of the invention it has been found that the production of the desired alkyl derivative can be attained without the use of any catalyst whatever and the practice of the invention accordingly results in economies by reason of the fact that it involves a satisfactory method of producing the desired alkyl derivatives without resort to the use of large quantities of catalyst or of elaborate operations to effect removal of such catalyst from the ultimate reaction mixture. In the practice of the invention in the production of tertiary amyl phenol, for example, tertiary amyl chloride may be mixed with a molecular equivalent of phenol and the mixture heated to a temperature between 80 and 100° C. for a period of approximately eighteen hours under efficient reflux conditions, hydrogen chloride being removed from the reaction mixture through the reflux column during this period. As soon as the evolution of hydrogen chloride has ceased, the contents of the reaction vessel are vigorously refluxed for a period of one-half hour at a temperature of approximately 180° C. and at the conclusion of this vigorous reflux operation the material may be distilled at normal pressure to effect removal of undesired ingredients and afford a yield of relatively pure tertiary amyl phenol. While the exact mechanism of this reaction is not definitely determined, it is believed that the phenol first reacts with the tertiary amyl chloride to produce tertiary amyl phenyl ether and that this tertiary amyl phenyl ether is converted into the corresponding tertiary amyl phenol by the vigorous refluxing operation which follows the completion of the evolution of hydrogen chloride.

As an alternative to the above procedure, a relatively small amount of catalyst may be used to speed up the reaction. Such catalyst may comprise a metal or metal oxide or chloride, such for example, as ferric oxide, tin oxide, zinc oxide, ferric chloride, aluminum chloride, iron, aluminum or zinc. When the process is carried out by means of a catalyst, it still differs essentially from the Friedel & Crafts reaction, for it is unnecessary in the practice of the present process in producing secondary and tertiary derivatives of phenolic compounds by reaction between a phenolic compound and a secondary or tertiary alkyl chloride, to use more than a very small proportion of catalyst. The present invention contemplates the use of not more than three percent of such catalytic material based upon the amount of phenolic compound subjected to the reaction and in the preferred practice of the invention only a fraction of one percent of catalyst is employed. As a still further alternative, the initial reaction between the secondary or tertiary chloride and the phenolic derivative with which it is to be reacted can be conducted in the absence of catalysts, and a relatively small proportion of catalyst, such as that indicated in the paragraph above, may be added to the reaction mixture prior to the ultimate vigorous refluxing operation by which the final secondary or tertiary alkyl phenolic compound is produced.

In illustrative examples of the practice of the invention, the following procedures were adopted:

Example 1

8 mols of tertiary amyl chloride were placed in a 5 liter flask with 8 mols of phenol and gently boiled under efficient reflux at a temperature of 80 to 100° C. for a period of 18 hours. During this period a slow steady stream of hydrogen chloride gas was evolved. At the conclusion of 18 hours the evolution of hydrogen chloride ceased and the contents of the flask were then vigorously refluxed for a period of one-half hour at a temperature of 180° C. The material was then distilled at normal pressure through an efficient laboratory column. The distillation gave the following cuts:

| Cut | Boiling point | Material | Weight | Softening point |
|---|---|---|---|---|
| | | | Grams | |
| 1 | 60–100° | Tertiary amyl chloride. | 168 | |
| 2 | 100–200° | Phenol | 279 | |
| 3 | 200–248° | Intermediate | 30 | About 45° |
| 4 | 248–255° | Tertiary amyl phenol. | 734 | 85° |
| 5 | | Residue | 18 | |

Example 2

9.38 mols (999 grams) of tertiary amyl chloride were placed in a flask with 9.38 mols (882 grams) of phenol and 2 grams of iron rust were added to the mixture which was then gently refluxed, as in Example 1 above. After a period of two hours the evolution of hydrogen chloride was practically complete. The mixture was then strongly refluxed for one-half hour, as in Example 1, and distilled. The distillation gave the following cuts:

| Cut | Boiling point | Material | Weight | Softening point |
|---|---|---|---|---|
| | | | Grams | |
| 1 | To 100° | Tertiary amyl chloride. | 79 | |
| 2 | 100–200° | Phenol | 130 | |
| 3 | 200–248° | Intermediate | 20 | |
| 4 | 248–255° | Tertiary amyl phenol. | 1236 | 85° |
| | | Residue | 22 | |

Example 3

690 grams of secondary amyl chloride were placed in a flask with 608 grams of phenol, 10 grams of water and 15 grams of iron rust. The mixture was gently refluxed, as in Example 2 above, until the evolution of hydrogen chloride was completed. The mixture was then vigorously refluxed, as in the above examples, to effect conversion of the phenolic derivative formed as the result of the initial reflux to secondary alkyl phenol. The material was then distilled at normal pressure and yielded 403 grams of material boiling between 239 and 265° C. and comprising a mixture of ortho- and para- secondary amyl phenols.

While the method has been specifically described with reference to the production of secondary and tertiary alkyl phenolic derivatives containing in their alkyl radicals five carbon atoms, it will be understood that it is also applicable to the production of derivatives containing more than five atoms as well as of the corresponding secondary and tertiary butyl phenolic compounds. In this connection, the invention has been found to be useful in effecting the production of a mixture of secondary dodecyl phenols by reacting a corresponding mixture of secondary dodecyl chloride with phenol by the general procedure described above.

Modifications will be obvious to those skilled in the art and I do not therefore wish to be limited except by the scope of the sub-joined claims.

I claim:

1. In the production of compounds chosen from the class consisting of secondary and tertiary alkyl derivatives of phenols by alkylation, the process comprising gently heating an alkyl halide containing the desired alkylating radical together with the phenol to effect reaction between the alkyl halide and the phenol with formation of hydrogen halide and thereafter vigorously heating the resulting mixture after the completion of the evolution of hydrogen halide therefrom, the initial heating operation being conducted in the absence of alkylating catalyst and the subsequent vigorous heating operation being conducted in the presence of a quantity of alkylating catalyst chosen from the class consisting of ferric oxide, tin oxide, zinc oxide, ferric chloride, aluminum chloride, iron, aluminum and zinc comprising less than 3% by weight based upon the amount of the phenol subjected to the alkylation reaction.

2. In the production of compounds chosen from the class consisting of secondary and tertiary alkyl derivatives of phenols by alkylation with a secondary or tertiary alkyl halide containing from four to six carbon atoms, the process comprising gently heating an alkyl halide containing the desired alkylating radical together with the phenol to effect reaction between the alkyl halide and the phenol with formation of hydrogen halide and thereafter vigorously heating the resulting mixture after the completion of the evolution of hydrogen halide therefrom, the initial heating operating being conducted in the absence of alkylating catalyst and the subsequent vigorous heating operation being conducted in the presence of a quantity of alkylating catalyst chosen from the class consisting of ferric oxide, tin oxide, zinc oxide, ferric chloride, aluminum chloride, iron, aluminum and zinc comprising less than 3% by weight based upon the amount of the phenol subjected to the alkylation reaction.

3. In the production of compounds chosen from the class consisting of secondary and tertiary amyl derivatives of phenols by alkylation, the process comprising gently heating an amyl halide containing the desired alkylating radical together with the phenol to effect reaction between the amyl halide and the phenol with formation of hydrogen halide and thereafter vigorously heating the resulting mixture after the completion of the evolution of hydrogen halide therefrom, the initial heating operation being conducted in the absence of alkylating catalyst and the subsequent vigorous heating operation being conducted in the presence of a quantity of alkylating catalyst chosen from the class consisting of ferric oxide, tin oxide, zinc oxide, ferric chloride, aluminum chloride, iron, aluminum and zinc comprising less than 3% by weight based upon the amount of the phenol subjected to the alkylation reaction.

4. In the production of compounds chosen from the class consisting of secondary and tertiary alkyl phenols by alkylation the process comprising gently heating the alkyl halide containing the desired alkylating radical together with phenol to effect reaction between the alkyl halide and phenol with formation of hydrogen halide and thereafter vigorously heating the resulting mixture after the completion of the evolution of hydrogen halide therefrom, the initial heating operation being conducted in the absence of alkylating catalyst and the subsequent vigorous heating operation being conducted in the presence of a quantity of alkylating catalyst chosen from the class consisting of ferric oxide, tin oxide, zinc oxide, ferric chloride, aluminum chloride, iron, aluminum and zinc comprising less than 3% by weight based upon the amount of the phenol subjected to the alkylation reaction.

JOHN F. OLIN.